United States Patent [19]

Iwashita et al.

[11] 4,283,518

[45] Aug. 11, 1981

[54] PROCESS FOR MANUFACTURING A PETROLEUM RESIN

[75] Inventors: Toru Iwashita, Yokkaichi; Mineo Nagano, Shinnanyo; Koji Tanaka, Yokkaichi, all of Japan

[73] Assignee: Toyo Soda Manufacturing Co., Ltd., Shinnanyo, Japan

[21] Appl. No.: 103,538

[22] Filed: Dec. 13, 1979

[30] Foreign Application Priority Data

Dec. 13, 1978 [JP] Japan ................................. 53-153062

[51] Int. Cl.$^3$ .................... C08F 212/06; C08F 212/08
[52] U.S. Cl. ...................................... 526/237; 526/76; 526/290
[58] Field of Search .......................... 526/76, 290, 237

[56] References Cited

U.S. PATENT DOCUMENTS

| | | | |
|---|---|---|---|
| 2,317,858 | 4/1943 | Soday | 526/290 |
| 2,817,647 | 12/1957 | Habeshaw et al. | 526/290 |
| 2,862,914 | 12/1958 | Leary et al. | 526/76 |
| 4,156,762 | 5/1979 | Kudo et al. | 526/76 |

*Primary Examiner*—Harry Wong, Jr.
*Attorney, Agent, or Firm*—Armstrong, Nikaido, Marmelstein & Kubovcik

[57] ABSTRACT

The present invention relates to a process for manufacturing a petroleum resin wherein a fraction (component A) containing an aromatic hydrocarbon obtained by cracking of petroleum and a thermally polymerized oil (component B) obtained by previously thermal-polymerizing the component A are mixed and then the mixture of the components A and B is subjected to polymerization by employing a Friedel-Crafts catalyst. It is also directed to propose a petroleum resin of a superior quality having a softening point optionally in a range of 30°–120° C. and various bromine value in such a manner that a mixing ratio of the components A and B is properly adjusted.

4 Claims, No Drawings

PROCESS FOR MANUFACTURING A PETROLEUM RESIN

DETAILED DESCRIPTION OF THE INVENTION

The present invention relates to a process for manufacturing a petroleum resin from fraction containing aromatic hydrocarbons obtained by cracking of petroleum.

The petroleum resins are used for various purposes such as coating, adhesives, rubber compound, paper sizing material, etc. The petroleum resins have been required to have properties according to the use, particularly to have a peculiar range of a softening point and have been provided with various properties by adjusting requirements when manufacturing the petroleum resin. However, the petroleum resins of the aromatic system are obtained only of a high softening point by the conventional process and have hitherto been adjusted to have a relatively low softening point by the following methods: (1) adjusting in a polymerization temperature (2) adjusting a component of raw materials and (3) using a peculiar catalyst.

In the method (1), the polymerization temperature must be high in order to obtain a product of a low softening point, thereby increasing the coloring of the product remarkably. The method (2) lies in adjusting the amount of an indene or indene derivatives, for example, as a constituent of raising the softening point in a fraction of a stock oil or adjusting the concentration of a polymerizable component. However, the method (2) is restricted in a stock oil and not preferable in purification of the stock oil.

Further, the method (3) places a limit upon preparing individual resins of various softening points and requires a combination with the methods (1) and (2) which results in a complicated device.

The inventors of the present invention have examined the process for manufacturing a petroleum resin by utilizing a fraction containing an aromatic hydrocarbon obtained by cracking of petroleum as a stock oil and have discovered that a fraction (component A) containing the aromatic hydrocarbon obtained by cracking of petroleum is mixed with a fraction (component B) obtained from previously thermal-polymerizing of the component A and the mixture of the components A and B is subjected to polymerization by employing a Friedel-Crafts catalyst, and, in this process, a mixing ratio of the components A and B is properly adjusted to obtain a softening point optionally in a range of 30°–120° C. and therefore petroleum resins of a superior quality are thus manufactured.

The components A used in the present invention is a fraction containing an aromatic hydrocarbon obtained from cracking of petroleum and preferably a fraction in a range of boiling point 140°–280° C. and of containing an aromatic hydrocarbon such as styrene, vinyl toluene, indene, decyclopentadiene, etc.

However, if coloring matters or high molecular substances of a poor solubility are contained in a large quantity in the fraction, the distillates from the fraction are preferably used as stock oil by means of a distillation under reduced pressure, etc.

The thermal polymerization of the component A for obtaining the component B used in the present invention is carried out at a temperature of 180°–300° C., preferably 200°–280° C. and for a period of time from 10 minutes to 10 hours, preferably from 20 minutes to 3 hours. If the period of time for the thermal polymerization is less than the above range or the temperature is lower than 180° C., the product due to the thermal polymerization is formed in a small quantity and therefore the polymerization for the mixture of the component A and the obtained product is not effectively carried out.

Further, if the temperature of the thermal polymerization is more than 300° C. coloring matters or decomposed substances are formed during the thermal polymerization and causes a deterioration of a hue on the petroleum resin products.

Furthermore, in the present invention, a mixing ratio of the components A and B is important in obtaining a petroleum resin provided with a desirable softening point. The ratio of the component B in the mixed ingredients of the components A and B falls in a range of 1–99% and is preferably used in a range of 5–50%.

In order to obtain a petroleum resin of a relatively high softening point, the ratio of the component B is reduced in the above range and in order to obtain a petroleum resin of a low softening point, the ratio of the component B is increased, and thus in this manner the petroleum resins of the desirable softening point are obtained.

When the petroleum resins are obtained by the polymerization of the mixed ingredient of the components A and B, a Friedel-Crafts catalyst, for example, aluminum chloride, iron chloride(III), tin chloride(IV), titanium chloride, boron trifuoride, etc. is used. However, the aluminum chloride and boron trifluoride are preferable from the point of reaction activity and economy.

The polymerization process of the present invention in employing the above catalyst is not particularly restricted except that the component A is mixed with the component B. The mixed ingredients of the components A and B are added with 0.05–5% of the Friedel-Crafts catalyst and polymerized at a temperature of 30°–80° C. and for a period of time from 20 minutes to 10 hours, and then the employed catalyst is removed by decomposition by adding aqueous solution of alkali such as sodium hydroxide, sodium carbonate, etc. and the product is washed with water and further unreacted oils and low molecular polymerization substances are removed therefrom by means of distillation to obtain the petroleum resin. In this manner, the present invention proposes the petroleum resins individually provided with a range of softening point 50°–120° C.

The characteristics of the present invention are described as follows.

(1) The softening point of the obtained petroleum resins is changeable in a certain range by changing the mixing ratio of both components A and B.

(2) No complicated process is necessary for changing the catalyst, polymerization condition or stock oil suitably in order to obtain petroleum resins of various softening points.

(3) the obtainable petroleum resins are good in a hue and a solubility with other resins and solvents.

(4) In case that a cationic polymerization resin of the component A is only blended with a thermal polymerized material (the component B) of the component A to adjust the softening point, the additivity is realized. However to obtain a resin of a low softening point in this manner, a large quantity of the component B is necessary and a molecular weight distribution of the obtained resin is separated into two blocks. While, in this invention, since the component B brings a powerful effect on the fall of the molecular weight by a chain transfer effect in a cationic polymerization of the component A, the smaller quantity of the component B is added in comparison with the blending method aforementioned especially to obtain a resin of a low softening point, and further a molecular weight distribution of the obtained resin falls in narrow range and the obtained resin is superior in a quality.

(5) The present invention proposes resins in a relatively high degree of unsaturation and therefore the obtained resins are easy in a denaturation.

COMPARATIVE EXAMPLE 1

30 g of xylene, 2 g of propyleneoxide (P. O) and 6 g of anhydrous aluminum chloride were put in a flask equipped with a stirrer and mixed by a stirring under a dry nitrogen atmosphere for 5 hours to obtain an uniform solution ($P.O/AlCl_3=0.75$). The stock oil (the component A) was a fraction containing the following polymerizing ingredients in the range of a boiling point 140°–280° C.

| | |
|---|---|
| Styrene | 3% |
| α-methyl styrene | 1.5% |
| o-, m-, p- vinyl toluene | 19% |
| Dicyclopentadiene | 11% |
| β-methyl styrene | 2% |
| Indene | 11% |
| Indene derivative | 5% |

The polymerization was carried out by putting 1,000 g of the stock oil into a separable flask of 2,000 ml at the temperature of 50° C. for 1 hour. The catalyst prepared by the aforementioned method was all added to the reaction systems within 30 minutes after the starting of reaction. The polymerization was carried out under a dry nitrogen atmosphere.

After the polymerization was finished, the polymerized oil was added with 50 g of the aqueous solution of sodium hydroxide 30% to be neutralized and a water layer was removed after neutralization, and then an oil layer was washed twice by using water in the same quantity as the oil layer. The obtained oil layer was heated at 180°–190° C. in a nitrogen stream and an unreacted oil was removed by distillation therefrom.

The result of the various measured properties on the obtained resin was indicated in Table 1.

COMPARATIVE EXAMPLE 2

1,000 g of the component A of the same composition as the comparative example 1 were put into a pressure type autoclave of 2,000 ml and subjected to a thermal polymerization at the temperature of 230° C. for 3 hours with stirring. (The thermally polymerized oil was the component B). An unreacted oil in the component B was removed by distillation under the same condition as the comparative example 1.

The result of the various measured properties on the obtained resin was indicated in Table 1.

COMPARATIVE EXAMPLE 3

The polymerized oil, obtained in the comparative example 1, was mixed with the polymerized oil with unreacted oil before removal thereof obtained in the comparative example 2 at a weight ratio of 90:10 and then from the mixture was removed an unreacted oil under the same condition as the comparative example 1.

The result of the various measured properties on the obtained resin gas indicated in Table 1.

COMPARATIVE EXAMPLE 4

In the comparative example 3, the operation was carried out according to all the conditions of the comparative example 3 except a weight ratio 80:20.

The properties of the obtained resin were indicated in Table 1.

COMPARATIVE EXAMPLE 5

In the comparative example 3, the operation was carried out according to all the conditions of the comparative example 3 except a weight ratio 50:50.

The properties of the obtained resin were indicated in Table 1.

COMPARATIVE EXAMPLE 6

450 g of the resin obtained in the comparative example 1 and 50 g of maleic anhydride were put into an autoclave of 1,000 ml and made react at a temperature of 220° C. for 1 hour under fusing and stirring.

The obtained resin was disoleved into 2,000 g of xylene and washed by water repeatedly until representing no acidity to remove an unreacted maleic anhydride. From the resin was further removed xylene in a nitrogen stream at 210–220° C.

According to "Acid Value Measurement" (JIS K-5902), the reaction ratio of the obtained resin was 73%.

EXAMPLE 1

950 g of the component A indicated in the comparative example 1 and 50 g of the component B obtained in the comparative example 2 were mixed to prepare a stock oil. The all other operation was carried out according to the comparative example 1 except the preparation of the stock oil.

The result of the various measured properties on the obtained resin was indicated in Table 1.

EXAMPLE 2

900 g of the component A indicated in the comparative example 1 and 100 g of the component B obtained in the comparative example 2 were mixed to prepare a stock oil. The all other operation was carried out according to the comparative example 1 except the preparation of the stock oil.

The properties of the obtained resin were indicated in Table 1.

EXAMPLE 3

800 g of the component A indicated in the comparative Example 1 and 200 g of the component B obtained in the comparative example 2 were mixed to prepare a stock oil. The all other operation was carried out according to the comparative example 1 except the preparation of the stock oil.

The properties of the obtained resin were indicated in Table 1.

EXAMPLE 4

500 g of the component A indicated in the comparative example 1 and 500 g of the component B obtained in the comparative example 2 were mixed to prepare a stock oil. The all other operation was carried out according to the comparative example 1 except the preparation of the stock oil.

EXAMPLE 5

900 g of the component A indicated in the comparative example 1 and 100 g of the component B obtained in the comparative example 2 were mixed to prepare a stock oil. The all other operation was carried out according to the comparative example 1 except that 21 g of a boron trifluoride ether complex (47% solution) was used instead of the propyleneoxide (P. O) and aluminum chloride.

The properties of the obtained resin was indicated in Table 1.

EXAMPLE 6

The all other operation was carried out according to the comparative example 6 except that the resin obtained in the example 1 was used. The reaction ratio was 78%.

EXAMPLE 7

The all other operation was carried out according to the comparative example 6 except that the resin obtained in the example 3 was used. The reaction ratio was 83%.

EXAMPLE 8

The all other operation was carried out according to the comparative example 6 except that the resin obtained in the example 4 was used. The reaction ratio was 89%.

TABLE 1

| | Component B Comp. A + Comp. B | Kind of Catalyst | Catalyst Stock oil | (1) Hue | (2) Softening point (°C.) | (3) Conversion ratio (%) | (4) Bromine value | (5) Solubility/compatibility Linseed oil | (5) Solubility/compatibility Alkyd resin |
|---|---|---|---|---|---|---|---|---|---|
| Comparative example - 1 | 0 | $AlCl_3PO$ series | 0.6 | 10 | 130 | 48 | 25 | Partial soluble | Partial compatible |
| - 2 | 100 | — | — | 8 | 50 | 33 | 40 | Soluble | Transparent |
| - 3 | 10 | — | — | 9+ | 124 | 46.5 | 26 | " | Compatible |
| - 4 | 20 | — | — | 9 | 118 | 45 | 28 | " | " |
| - 5 | 50 | — | — | 8+ | 97 | 40.5 | 33 | " | " |
| Example - 1 | 5 | $AlCl_3PO$ series | 0.6 | 9 | 110 | 46 | 28 | Transparent | Transparent |
| - 2 | 10 | $AlCl_3PO$ series | " | 8+ | 102 | 44 | 35 | Transparent | Transparent |
| - 3 | 20 | $AlCl_3PO$ series | " | 8 | 93 | 37 | 40 | Transparent | Transparent |
| - 4 | 50 | $AlCl_3PO$ series | " | 8 | 58 | 33 | 50 | Transparent | Transparent |
| - 5 | 10 | $BF_3$ ether | 1.2 | 8+ | 100 | 43 | 35 | Transparent | Transparent |

(1) A hue was compared to the Gardner's Color Number Tube according to "Toluene 50% solution" ASTM-58T.
(2) According to the Ring and Ball Method (JIS K-2531-1960).
(3) Yield to a stock oil.
(4) Ordinary bromine measurement of using potassium bromate.
(5) A glass plate was coated with linseed oil (No.6)/ sample/ toluene = 30/ 20/ 50, phthalkyd 265 - 100/ sample/ toluene = 25/ 25/ 50 to prepare a 6 millimeter coated film and the coated film was subjected to a shelf test of 24 hours, and then subjected to a functional group test.

What is claimed is:

1. A process for manufacturing a petroleum resin comprising mixing (1) a fraction (component A) containing an aromatic hydrocarbon and obtained by the cracking of petroleum and having a boiling point in the range of 140°-280° C. and (2) a thermally polymerized oil (component B) which is a product obtained by polymerizing component A at a temperature of 180°-300° C. for a period of from 10 minutes to 10 hours, the amount of component B being from 1-99% by weight of the mixture; and subjecting said mixture of component A and component B to polymerization employing a Friedel-Crafts catalyst to obtain a petroleum resin having a softening point in the range of 50°-120° C.

2. A process for manufacturing a petroleum resin as defined in claim 1 wherein said component B is a product obtained by polymerizing component A at a temperature of 200°-280° C.

3. A process for manufacturing a petroleum resin as defined in claim 1 wherein an aluminum chloride or a boron trifluoride is used as said Friedel-Crafts catalyst.

4. A petroleum resin prepared according to the process of any claim 1, 2 and 3.

* * * * *

UNITED STATES PATENT AND TRADEMARK OFFICE
CERTIFICATE OF CORRECTION

PATENT NO. : 4,283,518
DATED : August 11, 1981
INVENTOR(S) : TORU IWASHITA ET AL It is certified that error appears in the above-identified patent and that said Letters Patent are hereby corrected as shown below:

(1) In Table 1, bridging columns 5 and 6, the first column heading should read:  --Component B / Comp. A + Comp. B --;

(2) in the same Table 1, the third column heading should read:  -- Catalyst / Stock oil --;

Signed and Sealed this

First Day of June 1982

[SEAL]

Attest:

Attesting Officer

GERALD J. MOSSINGHOFF
Commissioner of Patents and Trademarks